Sept. 10, 1946.　　　　W. R. BARRY　　　　2,407,467
APPARATUS FOR DETERMINING GEOGRAPHIC POSITIONS CELESTIALLY
Filed Sept. 30, 1944　　　6 Sheets-Sheet 1

Inventor
William R. Barry
By: *Shie & Shie* Attys.

Sept. 10, 1946. W. R. BARRY 2,407,467
APPARATUS FOR DETERMINING GEOGRAPHIC POSITIONS CELESTIALLY
Filed Sept. 30, 1944   6 Sheets-Sheet 6

Inventor.
William R. Barry

Patented Sept. 10, 1946

2,407,467

UNITED STATES PATENT OFFICE 2,407,467

APPARATUS FOR DETERMINING GEOGRAPHIC POSITIONS CELESTIALLY

William R. Barry, Valdosta, Ga.; Mrs. Willie R. Dewberry administratrix of said William R. Barry, deceased Application September 30, 1944, Serial No. 556,622

12 Claims. (Cl. 88—2.3)

My invention relates to an apparatus for the determination of geographical positions celestially, to wit, the observer's latitude and longitude. The invention has among its objects the production of an apparatus of the kind described enabling one to determine geographic positions celestially in a manner which will meet the needs of aerial or other navigation. The invention has among its further objects an apparatus accurate enough for aerial use and fast enough to be useful in emergencies where speed of determination is essential and vital. It has as a particular object an apparatus simple enough in theory and operation so that anyone in the aircraft could use it effectively and with comparatively little instruction and which would incorporate a minimum of probable errors, either careless or functional.

As a simple approach to the principles involved and the discussion of their application in this apparatus, I shall first discuss latitude and the discussion of their application in this apparatus. The two easiest lines of position determinable by means commonly in use at present are the Polaris correction shot and the meridional shot and both are comparisons of the body and the known declination of the body, resulting in latitude. Both are special types of lines of position and can be used only under special conditions and pertain to latitude only.

Four steps are necessary, exclusive of timing, to obtain LOP's (location of observer's positions) by either means, to wit:

(1) Polaris correction shot:
 (a) Shoot the altitude of the body.
 (b) Approximate LHA (local hour angle) of Aries.
 (c) Determine correction from the Polaris correction table for the appropriate LHA.
 (d) Apply the correction obtained in (c) to the altitude of the body determined in (a).
    This is latitude.

(2) Meridional shot:
 (a) Shoot the altitude of the body.
 (b) Determine that the body is near enough to the meridional plane that it may be treated as a meridional shot.
 (c) Determine the declination of the body from tables.
 (d) Apply altitude of body (a) to declination of body (c).
    This is latitude.

The number of steps involved in the obtaining of a fix and the complexity of the steps has a direct bearing on two things:
 (1) Time necessary to obtain the fix.
 (2) Number of possible errors.

The ideal solution to latitude would be the shooting of the altitude of a star precisely at a celestial pole, in which case the altitude of that star would be latitude without any correction applied, or without the necessity of any computation whatsoever.

By my improved apparatus in which I provide a synthetic or simulated sky system, I establish a means of making such a direct shot, in spite of the fact there is no star precisely at either North or South celestial poles. My improved apparatus affords a rapid means of measuring local hour angle. In my improved apparatus for determining the geographical positions celestially I employ what may be termed as a synthetic sky or a starfield or star-overlay. The synthetic sky may be defined as a device presenting the appearance of the sky with a celestial pole at its center, so arranged that synthetic stars have the same angular separation from other synthetic stars measured at a definite focal point that the corresponding real stars maintain. It may present the appearance of any or all of the celestial sphere. It may also present a distorted image corresponding to the distorted image of the actual sky when affected by optical devices employing refraction, reflection and similar phenomena. Its characteristic feature is that it may be made to coincide with the reflection of the real sky as viewed from the focal point at which angular dimensions of the synthetic sky are established.

Coinciding with the real sky as in the preceding paragraph, it is a means of establishing a line from the focal point of the synthetic sky through the center of the synthetic sky to the celestial pole, and it is further a means of establishing the degree of rotation of the actual sky about the celestial pole in relation to the horizon of the earth, any plane parallel to the horizon of the earth, or the plane perpendicular to the horizon of the earth, in which the central line so established lies, or any plane cutting celestial hour circles and meridians, from the sky which it may be desired to establish the rotational position of the sky, using a gravitational leveling device to establish a horizon.

My invention embodies a synthetic sky, incorporated in or used in conjunction with a device which establishes a horizon or plane parallel to the plane tangent to the earth's surface, and which also establishes an observer's meridian or a plane perpendicular to the plane tangent to the earth's surface, and in which the line of sight or the line from the focal point of the synthetic sky through the center of the synthetic sky lies, affords a means of directly measuring the observer's latitude or the altitude of the elevated celestial pole above the plane tangent to the earth's surface, and also the observer's local hour angle of Aries (LHA of Aries) or the rotational position of the real sky in relation to the plane perpendicular to the plane tangent to the earth's surface in which lies the line from the focal point of the synthetic sky through the center of the synthetic sky.

Since any leveling device dependent upon the gravitational force may be used to establish a plane tangent to the earth's surface, and simultaneously a line perpendicular to the plane tangent to the earth's surface, by employing this line in conjunction with the line in sight, a plane may be established which includes both lines. The plane so established will pass through (1) the observer's geographical position, (2) the observer's zenith, (3) the observer's nadir, (4) the center of the earth, (5) the celestial pole (when synthetic sky is in coincidence with the real sky), (6) the earth's pole, and is, therefore, the plane which cuts the observer's meridian and simultaneously the observer's hour circle, since the observer's hour circle is the infinite projection of his meridian. This plane so established as passing through the line from the observer's zenith to his nadir and the line of sight will hereafter be designated as the plane of sight.

By establishing a rotational scale of the synthetic sky and by using the plane of sight as an index for the rotational scale, it may be seen that a direct reading of LHA of Aries is obtained. The measurement of the elevation of the line of sight of the synthetic sky above the horizon affords a direct reading of latitude.

My improved device is designed to permit observation of the celestial sky simultaneously with observation of the synthetic sky and by properly setting the instrument to determine immediately the latitude and longitude of the observer upon reference to the tables of local hour angles, thus it requires only the few moments time for a navigator to determine his exact latitude and longitude. The importance of the instrument for aerial navigation is obvious.

The invention has among its other objects the production of a compact, light-weight, efficient, inexpensive and simple device of the kind described which may be held in the hands or suitably mounted on a plane or any other moving craft from which it may be desired to quickly ascertain latitude and longitude.

To this end my invention consists of the novel method herein described and in the construction, combination and arrangement of parts herein shown in the accompanying drawings.

Referring to the drawings.

Referring to the drawings, in which an embodiment of the invention is shown, it may be mentioned that the same consists generally of a housing made up of a number of parts within which is arranged a semi transparent reflecting mirror constructed to permit the observation by reflection of the celestial sky as well as observation through the mirror of the synthetic sky. There is also provided what may be termed a latitude ring having means for establishing an artificial horizon and a longitude ring carrying what may be termed a synthetic sky, the synthetic sky being preferably opaque and bearing upon its face transparent indicia or symbols representing stars in the celestial sky. Illuminating means is arranged to illuminate the synthetic sky when viewed through an eye piece along a line of sight. Suitable means is provided for varying the relation of the latitude and longitude rings relative the housing and horizon.

Figure 3:
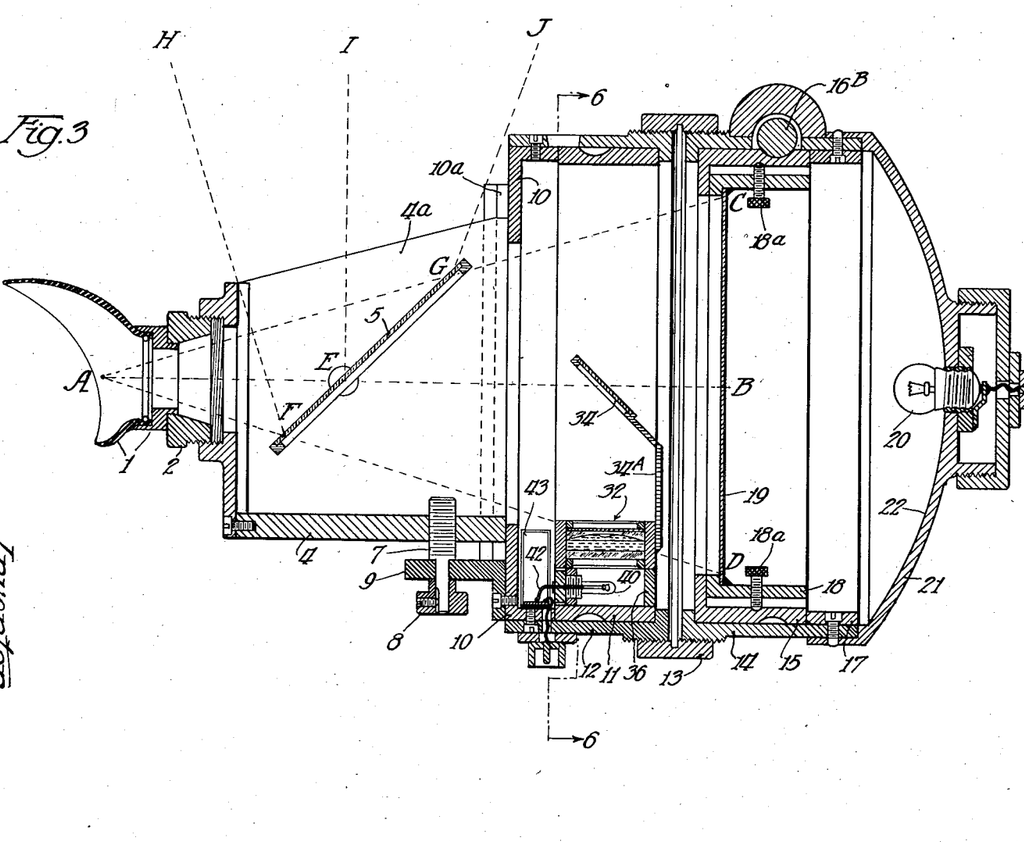
Fig. 3 is a horizontal section taken on the line 3—3 of Fig. 1.
Figure 4:
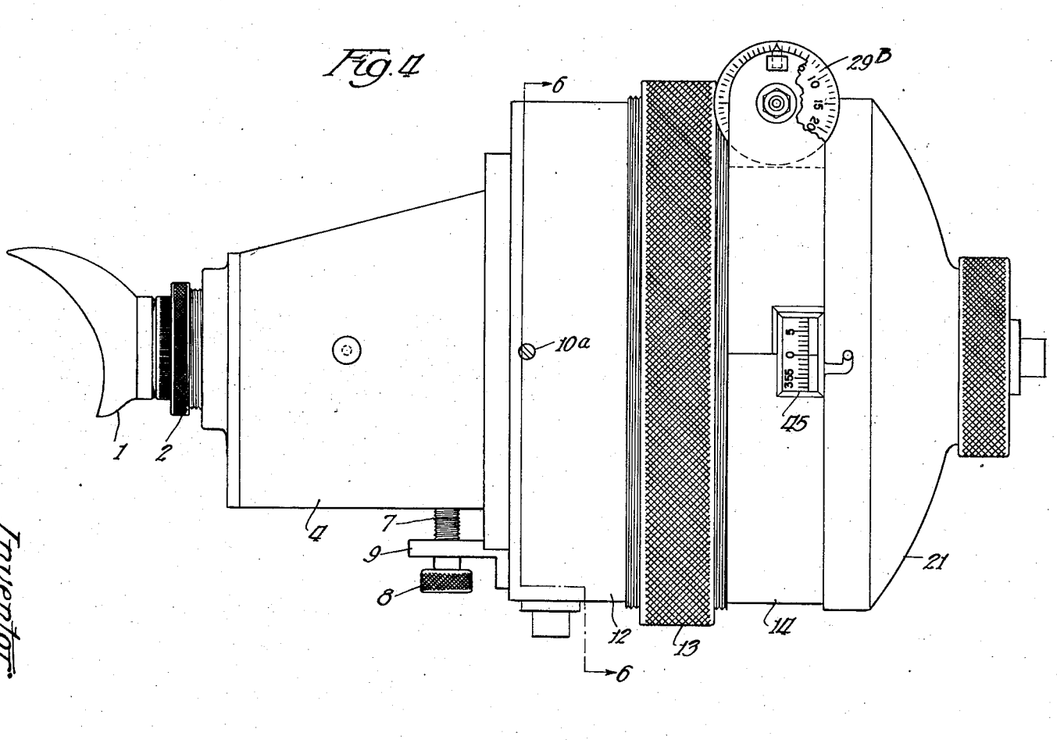
Fig. 4 is a view looking in the direction of the arrow 4 in Fig. 2.
Figure 5:
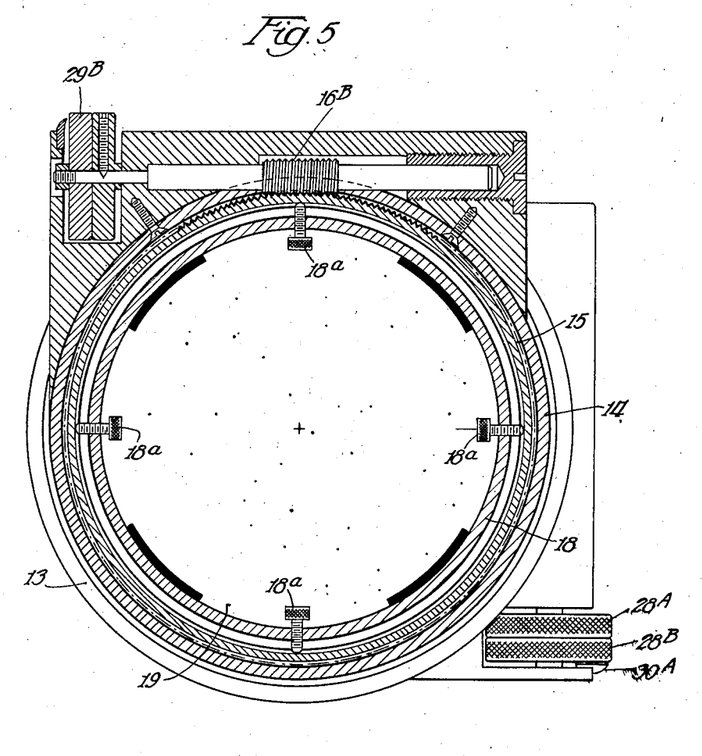
Fig. 5 is a vertical cross section taken on the line 5—5 of Fig. 2.

In Fig. 3 the parts are oriented with the reflecting mirror exposed in the general direction toward the zenith, and showing the bubble level adjusted to a level position. When the reflecting mirror is directed toward the celestial pole the latitude ring and therewith the bubble level must be adjusted to bring the bubble level into a level position.

The housing consists of a box 4 having an opening at either end along the line of sight and a further opening at one side 4a to permit the celestial sky to be seen through its reflection on a suitable mirror. The box 4 is attached to an end plate of a barrel plate 10 having an opening therethrough to correspond or register with the adjacent opening in the box 4 along the line of sight of the instrument. The barrel 10 is mounted in what may be termed a barrel latitude segment 12 which carries a latitude ring 11. The barrel latitude segment and the barrel plate 10 are suitably secured together, maintaining the latitude ring 11 in place. There is a similar barrel longitude section 14 which carries a longitude ring 15 which is maintained in place between the barrel segment 14 and a lock ring 17 secured to the barrel segment 14. Segments 12 and 14 are adjustably secured together by a range adjuster 13, having a right and left thread engaging threads in the segments. Longitude ring 15 carries an adjustable ring 18 which carries the synthetic sky field 19, which is preferably an opaque sheet upon which is depicted by transparent dots a representation of a celestial sky showing stars in proper angular relation to each other. At the end of the instrument and enclosing the same is a plate 21 providing a light housing.

As shown, particularly in Fig. 3, the box 4 is adjustable in slide ways 10a on the barrel and plate 10, being slidable so that it may be adjusted in the instrument. The adjustment is brought about by means of a screw 7 carried by a bracket 9 on the barrel plate 10, 8 being a knurled knob and set screw locked to 7.

Figure 1:
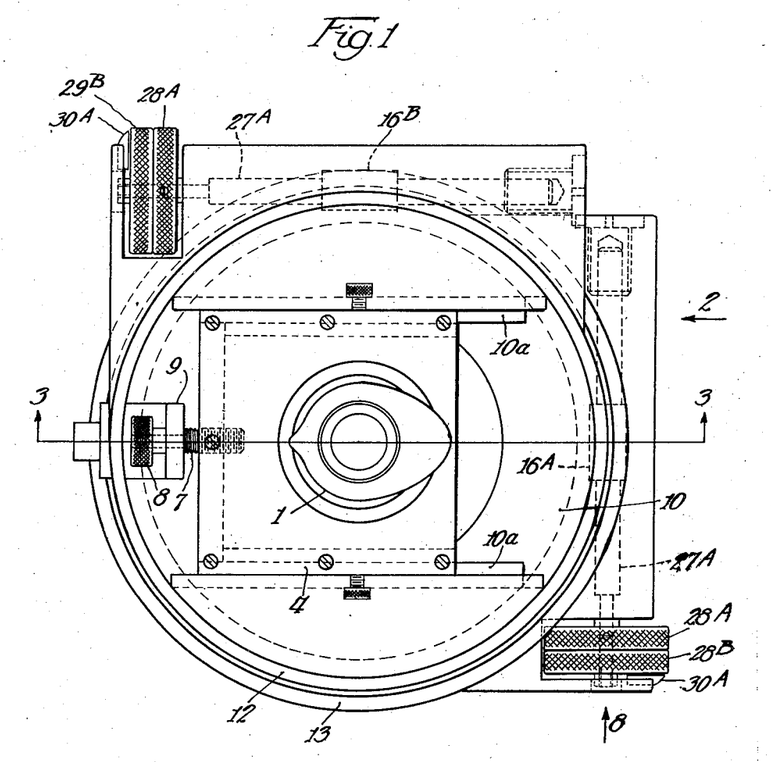
Fig. 1 is an eye piece or near end elevation of my improved device.
Figure 2:
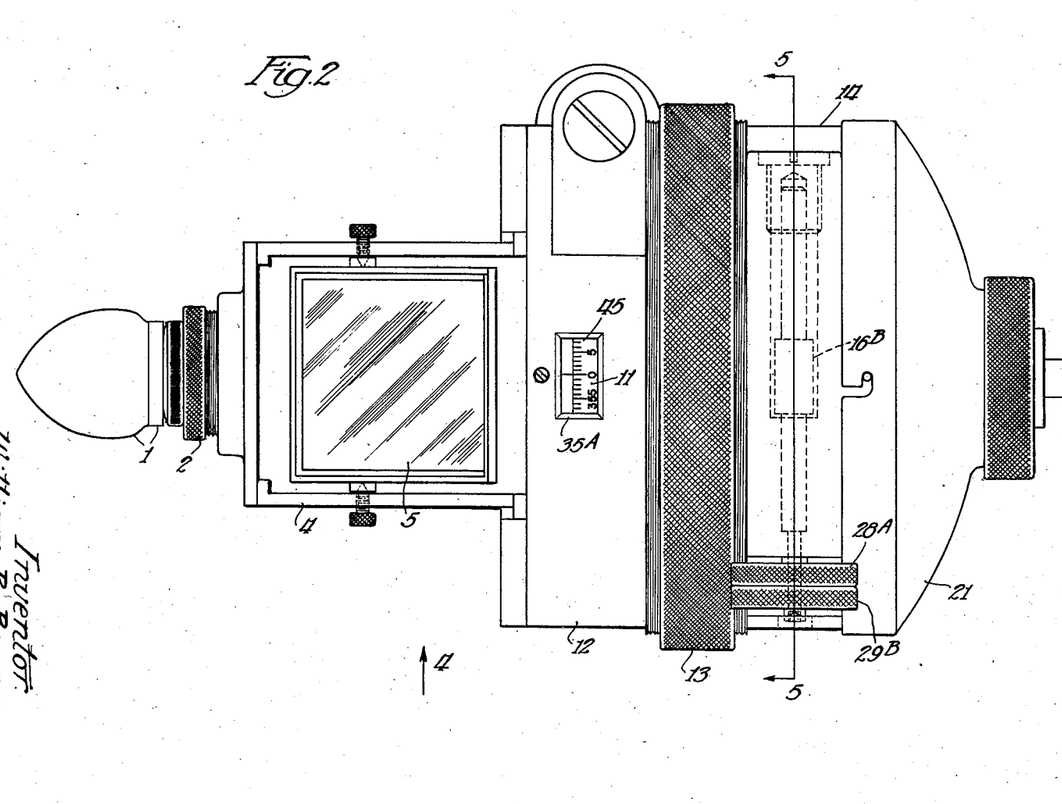
Fig. 2 is a side elevation thereof looking in the direction of the arrow 2 in Fig. 1.

On the box is an eye piece 1 and a suitable lens carried by an eye piece adjuster 2. The line of sight through the eye piece is from A to B, B being the celestial pole of the synthetic sky as depicted on 19. A light 20 is arranged in the line of sight and provided with suitable means for illuminating the same, such as an electric light and battery which is not shown. Arranged in the box 4 is the mirror previously described which box has an open side as most clearly shown in Figs. 2 and 3. The reflector or mirror is adjusted within the box at an angle intercepting the optical axis or line of sight at approximately forty-five degrees measured along the plane of elevation. As mentioned before, this reflecting surface is such that the reflection of the celestial sky may be seen through the eye piece 1 and the synthetic sky may also be seen from 1 through the reflecting surface. The field of sight of the instrument runs from focal point A with an optical axis A—B and range of vision of approximately sixteen degrees in each direction from the optical axis A—B, giving a maximum line of sight A—C and A—D. Corresponding angles of sight of the reflected image of the sky on the mirroring surface 5 is represented by the dotted lines E—I, intercepting the optical axis A—B at point E at an angle of ninety degrees, and lines F—H and G—J intercepting A—D and A—C, respectively.

The barrel segment 12 and the latitude ring 11 are operatively connected by a worm gear mechanism in which the ring is provided with teeth on the same meshing with the teeth on a worm 16A. The latitude ring is provided with indicia 45 (see Fig. 2) which may be observed through an opening 35A in the barrel, the indicia representing degrees or fractions thereof. There is also provided a knurled knob 28A on the worm shaft 27A for manipulating the worm and there is also provided an adjustable knurled knob 28B which may be secured on the shaft through the knob 28A which is provided with indicia indicating minutes or fractions thereof and which cooperates with the pointer 30A on the bracket at the side of the instrument.

Figure 6:
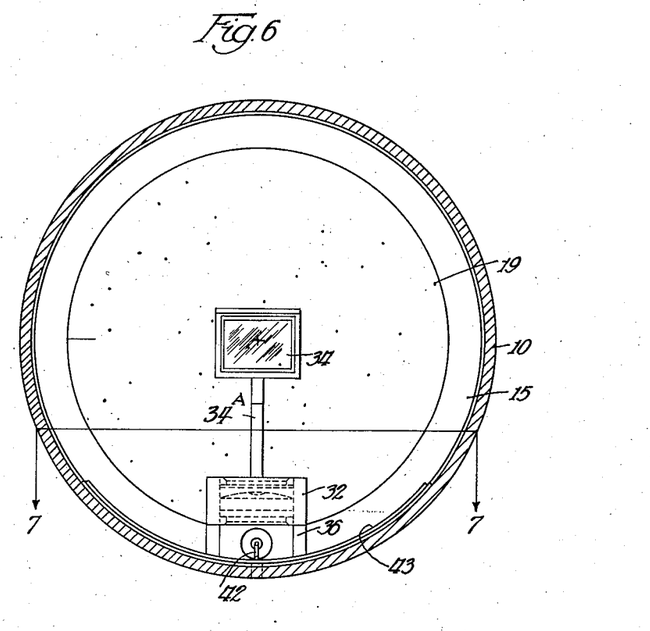
Fig. 6 is a vertical section taken on the line 6—6 of Fig. 3.
Figure 7:
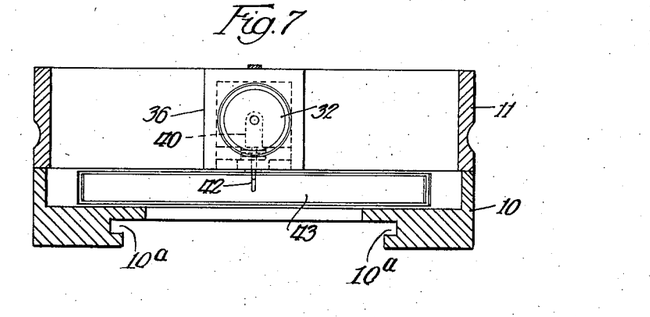
Fig. 7 is a horizontal section taken on the line 7—7 of Fig. 6.
Figure 8:
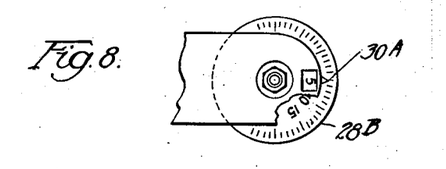
Fig. 8 is a view of a certain bracket and knurled knob looking in the direction of the arrow 8 in Fig. 1.

The latitude ring 11 carries a leveling device which as shown is a bubble level 32 (see Fig. 3 as well as Figs. 6 and 7). This level provides for the horizon within the instrument. In order that the bubble may be read from the eye piece at 1, a transparent mirror 34 is arranged within the latitude ring and carried thereby with the leveling device. I have shown in Fig. 3 how the bubble may be illuminated so that it may be readily read when the instrument is in use. As shown in this figure, 32 represents the level which carries an arm 34A to which a mirror 34 is secured, this mirror also being such that it may be used to reflect the bubble as well as to permit observation through the same along the line of sight. A simple illuminating device is shown in which 36 designates a hollow block carrying the bubble level, and in which is secured a small electric lamp 40, which transmits light through the bubble level to the mirror 34. Any suitable means may be employed for energizing the lamp, as for example, an electric circuit suitably connected to contacts 42 and 43 so that contact is maintained. Of course, if the source of energy is within the housing and carried by the latitude ring 11, the connections may be direct.

The longitude ring 15 is likewise rotated in the housing by means of a worm 16B engaging teeth in the periphery of the ring. Knobs and indicating means are provided similar to that described for the latitude ring. This ring is also provided with indicia 45 displayed through an opening in the barrel and graduated in angles or portions thereof, the knob 29B being similarly provided with gradations. Adjustably mounted in the longitude ring as by screws 18a is a frame 18 which carries the synthetic sky 19 and permits proper adjustment thereof within the ring. The light 20 is at the rear side of the synthetic sky, as shown in Fig. 3, 22 being a reflecting surface.

Assuming the device to be constructed substantially as shown, in using the instrument to determine latitude and longitude, for example, in the northern hemisphere, the synthetic sky simulating the celestial sky as seen in the northern hemisphere, the observer would face the general direction of east (or west depending on the location of the open side of the box) and, holding the instrument, bring the open side of the box 4 to face the celestial sky, so that the celestial sky would be reflected by the mirror 5 to the focal point. Looking through the sight from A, the observer would see the reflected Polaris in the mirror and at the same time observe the celestial pole and Polaris on the synthetic sky. When Polaris in both the celestial sky and synthetic sky coincide the user knows that the celestial poles on the celestial sky and the synthetic sky coincide in the line of sight. The instrument should be maintained so that the level bubble is in its central position, assuring that the instrument is level and not tilted in any way, thereby establishing the horizon. The observer then manipulates the knob 28B, thereby adjusting the relative relation of the barrel 10 and latitude ring 11. While the latitude ring is controlled by the knob, actually the relative movement between the barrel and ring is brought about by the tilting of the barrel or housing since the level is carried by the ring and the ring is maintained in proper relation to the horizon. The relative movement of the barrel in angles and minutes is indicated in angles in degrees through the opening 35A and on the indicated angles or minutes on the knob. At the same time the observer may turn knob 29A until the synthetic sky is rotated with the longitude ring 15 in the barrel 14, bringing the stars in the synthetic sky as seen through the reflecting surface 5 to coincide with the celestial stars as reflected on the mirror 5. The observer may then read the scales on the latitude ring 11 and longitude ring 14 and knobs 28B and 29A, which gives him the angles in degrees and minutes for latitude and longitude. Of course, in making his adjustments of the instrument, it is necessary for him to watch the bubble so that the instrument may be maintained in proper relation to the horizon. The observer may then refer to his tables showing the local hour angles, and from the tables know immediately his latitude and longitude, which gives him his position geographically.

Instead of reflecting the celestial sky the eyepiece may be placed on the box opposite the side opening so that the celestial sky may be seen through it with the synthetic sky reflected by the semitransparent mirror.

The foregoing description sets forth generally the construction and operation of one embodiment of the invention and the method of taking readings. The apparatus is susceptible to many changes and may be greatly simplified or made more complicated, the particular instrument shown being a desirable form, however.

Having thus described my invention, it is obvious that various immaterial modifications may be made in the same without departing from the spirit of my invention; hence, I do not wish

What I claim as new and desire to secure by Letters Patent is:

1. In a locating device of the kind described, the combination of an enclosure having an opening in one side and an eye opening disposed in the longitudinal axis of the device, in an end of the enclosure, an illuminated plate in the other end of the enclosure disposed at right angles to the longitudinal axis of the device and having indicating marks thereon simulating the stars from which observations are made, a semi-transparent reflector located adjacent said side opening in the enclosure and extending at an angle of forty-five degrees to the line of sight from said eye opening to the center of said illuminated plate for reflecting to the eye opening the celestial sky as seen through the opening in said enclosure, a circular graduated latitude indicator and a circular graduated longitude indicator both rotatably mounted in said enclosure on the longitudinal axis thereof, level means for establishing a horizon, carried by said latitude indicator, and said illuminated plate being carried by said longitude indicator, and independent actuating means for separately adjusting said latitude and longitude indicators.

2. In a locating device of the kind described, the combination of a box having an open side and an eye opening disposed in the longitudinal axis of the device, in one end, a casing secured to said box, an opaque synthetic sky supported in said casing and visible through said eye opening, said synthetic sky being disposed at right angles to the longitudinal axis of the device, a partially transparent reflector secured in said box at an angle of forty-five degrees to a line of sight from said eye opening to said synthetic sky for reflecting to the eye opening the celestial sky as seen through the open side of the box, the latter having indicating marks thereon disposed in simulation of the stars from which observations are made, a light source behind said synthetic sky, a rotatable graduated latitude ring and a rotatable graduated longitude ring, both rotatably mounted in said casing on the longitudinal axis thereof with the synthetic sky secured to the longitude ring, a bubble level secured to said latitude ring and individual means to independently rotate the latitude and longitude rings.

3. In a locating device of the kind described, the combination of a box open at one side, and having an eye opening disposed in the longitudinal axis of the device in one end, a casing secured to said box, a plate disposed at right angles to the longitudinal axis of the device supported in said casing and visible through said eye opening, a partially transparent reflector secured in said box at an angle of forty-five degrees to a line of sight from the eye opening to the center of said plate for reflecting to the eye opening the celestial sky as seen through the opening in said enclosure, the latter having indicating marks thereon disposed in simulation of the stars from which observations are made, a light source behind said plate, a rotatable graduated latitude ring, and a rotatable graduated longitude ring both rotatably mounted in said casing disposed at right angles to the longitudinal axis thereof with the plate secured to the longitude ring, a bubble level secured to said latitude ring, a reflector carried in position to reflect the image of the bubble level to the eye opening, and individual means to separately rotate the latitude and longitude rings.

4. In a locating device of the kind described, the combination of a box open at one side and having an eye opening disposed in the longitudinal axis of the device, in one end, an extensible and contractible casing secured to said box, an illuminated plate in the other end of the casing disposed at right angles to the longitudinal axis of the device and having indicating marks thereon simulating the stars observed in taking observations, a semi-transparent celestial sky reflector in said box disposed at an angle of forty-five degrees to the line of sight from the eye opening to the center of the plate for reflecting to the eye opening the celestial sky as seen through the opening in said enclosure, a rotatable graduated latitude ring and a rotatable graduated longitude ring both rotatably mounted in said casing on the longitudinal axis of the device, a bubble level mounted on said latitude ring, a reflector carried by said latitude ring for reflecting the image of said bubble level to the eye opening, and individual means to independently rotate said latitude and longitude rings.

5. In a locating device of the kind described, the combination of a box open at one side and having an eye opening disposed in the longitudinal axis of the device, in one end, an extensible and contractible casing secured to said box, an illuminated plate in the other end of the casing disposed at right angles to the axis of the device and having indicating marks thereon simulating the stars to be observed in taking observations, a semi-transparent reflector in said box disposed at an angle of forty-five degrees to the line of sight from the eye opening to the center of the plate for reflecting to the eye opening the celestial sky as seen through the open side of the box, a rotatable graduated latitude ring and a rotatable graduated longitude ring both rotatably mounted in said casing on the longitudinal axis thereof, a bubble level mounted on said latitude ring, a reflector carried by said latitude ring for reflecting the image of said bubble level to the eye opening, and individual means to separately rotate said latitude and longitude rings, including graduated discs having graduations thereon subdividing the graduations on the latitude and longitude rings.

6. An apparatus of the kind described comprising a housing having an eye piece at one end and a synthetic sky at the other end in the line of sight through the housing, the axes of both the eye piece and the synthetic sky being disposed in the longitudinal axis of the device, and the synthetic sky being disposed at right angles to said axis, a member having a reflecting surface disposed in the housing and cutting the line of sight between the eye piece and said synthetic sky at an angle of forty-five degrees, said housing provided with an opening at one side so disposed as to permit observation along the sight of reflection of the celestial sky through the eye piece, said reflecting surface constructed to reflect the celestial sky and to permit observation through the surface of the synthetic sky, said apparatus provided with level means for establishing a horizon, a latitude ring arranged within the housing having indicia thereon indicating angles for determining relative movements of the housing and latitude ring, said level means being carried by said ring, and a longitude ring also provided with indicia indicating angles of rotation of the ring within the housing, said longitude ring carrying said synthetic sky, and individual means for rotating said rings independently of each other.

7. In an apparatus of the kind described, a housing having an opening therein, a latitude ring arranged within the housing, and rotatable upon the longitudinal axis of the device, said housing and latitude ring being relatively adjustable, said latitude ring provided with indicia indicating angles, a longitude ring rotatably mounted in the housing on the longitudinal axis of the device and provided with indicia indicating angles of rotation, a synthetic sky carried by said longitude ring provided with indicia thereon simulating a view of the celestial sky, an eye piece, said synthetic sky and eye piece being disposed upon the longitudinal axis of the device with the synthetic sky arranged at right angles thereto, a reflector arranged within the housing at an angle of forty-five degrees to the line of sight between the eye piece and a determined point on the synthetic sky for reflecting to the eye piece the celestial sky as seen through the opening in said housing, a leveling device carried by said latitude ring for establishing a horizon in the apparatus, and manually operable means for controlling the relative positions of the latitude and longitude rings within the housing.

8. In an apparatus of the kind described and in combination a housing having an eye piece at one end and a plate constituting a synthetic sky simulating the celestial sky at the other end in the line of sight through the housing, the axes of the eye piece and synthetic sky being coincident with the longitudinal axis of the device, a member having a reflecting surface disposed in the housing and cutting the line of sight between the eye piece and said synthetic sky at an angle of forty-five degrees, said housing provided with an opening at one side so disposed as to permit observation along the sight of reflection of the celestial sky through the eye piece, said reflecting surface constructed to reflect the celestial sky and permit observation through the surface of the synthetic sky, said apparatus provided with leveling means for establishing an artificial horizon, a latitude ring rotatable on the longitudinal axis of the device and arranged within the housing having indicia thereon indicating angles for determining relative movements of the housing and latitude ring, said leveling means being carried by said latitude ring and a longitude ring rotatably mounted on the longitudinal axis of the device and also provided with indicia indicating angles of rotation of the ring within the housing, said longitude ring carrying said synthetic sky, means for illuminating the synthetic sky at the back face thereof, and independent means operatively engaging said rings for rotating the same in the device.

9. An apparatus of the kind described comprising in combination a housing comprising a box open at one side and at one end and having an eye opening at its opposite end, a casing having an open end secured with its open end to the open end of the box, an illuminated plate in the other end of the casing disposed at right angles to the longitudinal axis of the housing with its center disposed in said axis, and having indicia marks thereon simulating the stars observed in taking observations, a semi-transparent reflector mounted in said box at an angle of 45 degrees to the longitudinal axis of the housing, and functioning to reflect the celestial sky as it appears through said side opening to said eye opening, a graduated rotatable latitude ring rotatably mounted in said casing with its center disposed in the longitudinal axis of the housing, an illuminated bubble level carried by said latitude ring, a graduated rotatable longitude ring rotatably mounted in said casing with its center disposed in the longitudinal axis of the housing, and said illuminated plate being mounted on the longitudinal ring, and independent means for rotating the latitude and longitude rings.

10. An apparatus of the kind described comprising in combination a housing comprising a box open at one side and at one end and having an eye opening at its opposite end, a casing having an open end secured with its open end to the open end of the box, an illuminated plate in the other end of the casing disposed at right angles to the longitudinal axis of the housing with its center disposed in said axis, and having indicia marks thereon simulating the stars observed in taking observations, a semi-transparent reflector mounted in said box at an angle of 45 degrees to the longitudinal axis of the housing, and functioning to reflect the celestial sky as it appears through said side opening to said eye opening, a graduated rotatable latitude ring rotatably mounted in said casing with its center disposed in the longitudinal axis of the housing, an illuminated bubble level carried by said latitude ring, a graduated rotatable longitude ring rotatably mounted in said casing with its center disposed in the longitudinal axis of the housing, and said illuminated plate being mounted on the longitudinal ring, two shafts journaled in said casing, each having a knob thereon, and worm pinions and worm gear connections between said shafts and the latitude ring and longitude ring respectively.

11. An apparatus of the kind described comprising in combination a housing, comprising a box open at one side and at one end and having an eye opening at its opposite end, a casing having an open end secured with its open end to the open end of the box, an illuminated plate in the other end of the casing disposed at right angles to the longitudinal axis of the housing with its center disposed in said axis, and having indicia marks thereon simulating the stars observed in taking observations, a semi-transparent reflector mounted in said box at an angle of 45 degrees to the longitudinal axis of the housing, and functioning to reflect the celestial sky as it appears through said side opening to said eye opening, a graduated rotatable latitude ring rotatably mounted in said casing with its center disposed in the longitudinal axis of the housing, a bubble level carried by said latitude ring, a semi-transparent reflector mounted on said bubble level to stand at an angle of 45 degrees to the longitudinal axis of the housing with its center disposed substantially in said longitudinal axis, a graduated rotatable longitude ring rotatably mounted in said casing with its center disposed in the longitudinal axis of the housing, and said illuminated plate being mounted on said longitudinal ring, means for rotating said latitude ring and other means for rotating said longitude ring.

12. In a locating device of the kind described, the combination of an enclosure having an opening therein, an illuminated plate in the enclosure, disposed at right angles to an axis of the device, and having indicating marks therein simulating the stars from which observations are made, a semi-transparent reflector located adjacent said opening in the enclosure and extending at an angle of forty-five degrees to and intersecting said axis, whereby light from the celestial stars as seen through said opening and the simulated stars will strike the reflector at the same angle, an eye opening in said enclosure optically aligned with said reflector for simultaneously receiving, on a common axis, both reflected and unreflected light striking said reflector, a graduated latitude indicator and a graduated longitude indicator rotatably carried by said enclosure, means for establishing a horizon, said latitude indicator being operatively related to said reflector and said means for indicating the angular relation about said first mentioned axis between said reflector and said horizon, said illuminated plate being carried by said longitude indicator, and independent actuating means for separately rotating said latitude and longitude indicators relative to said enclosure, about said first mentioned axis.

WILLIAM R. BARRY.